April 19, 1932. J. DE KONING 1,854,610
WORK FEEDING MECHANISM
Filed Feb. 21, 1930 5 Sheets-Sheet 1

INVENTOR.
Jacob De Koning
BY Rice and Rice
ATTORNEYS.

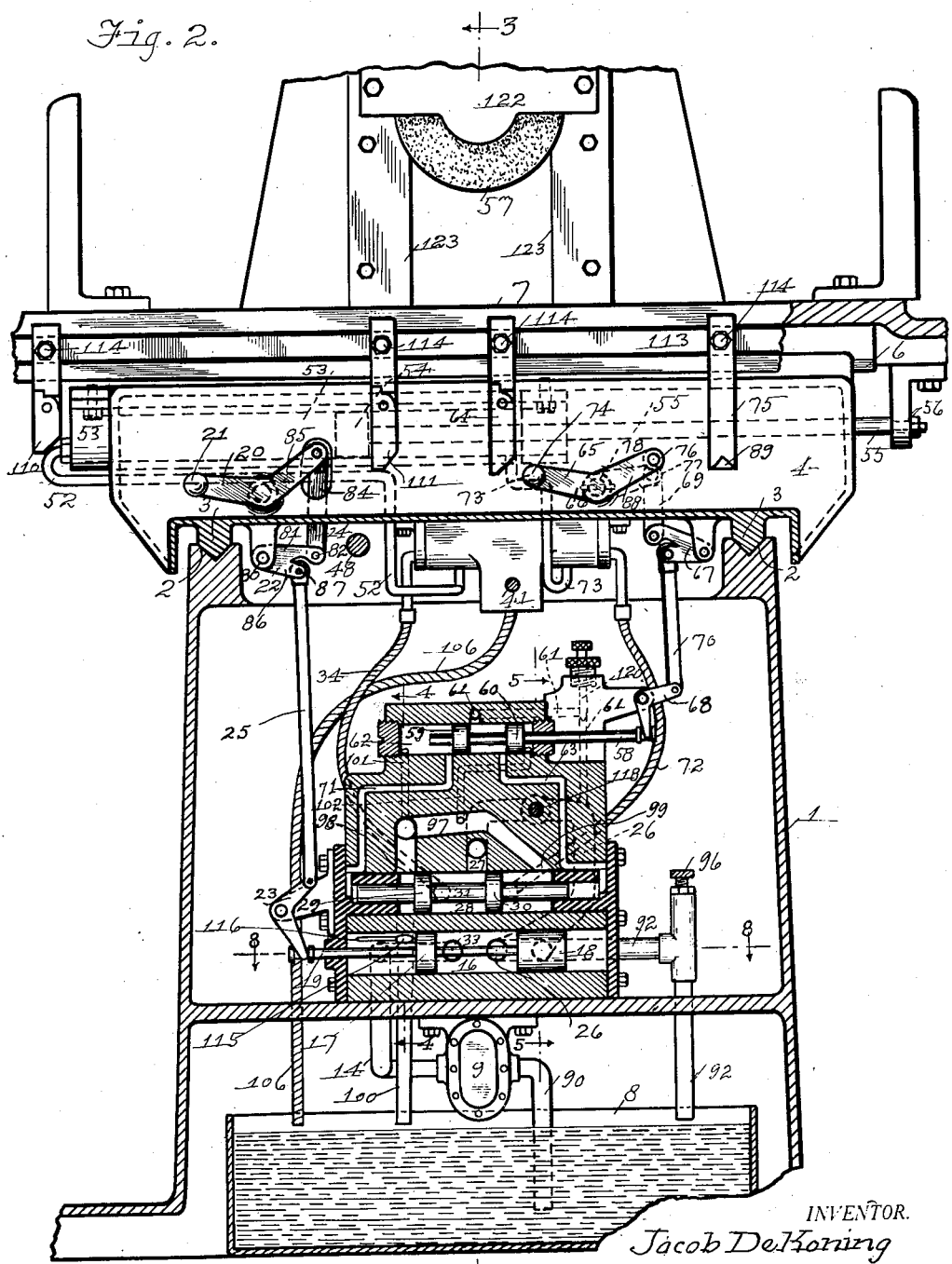

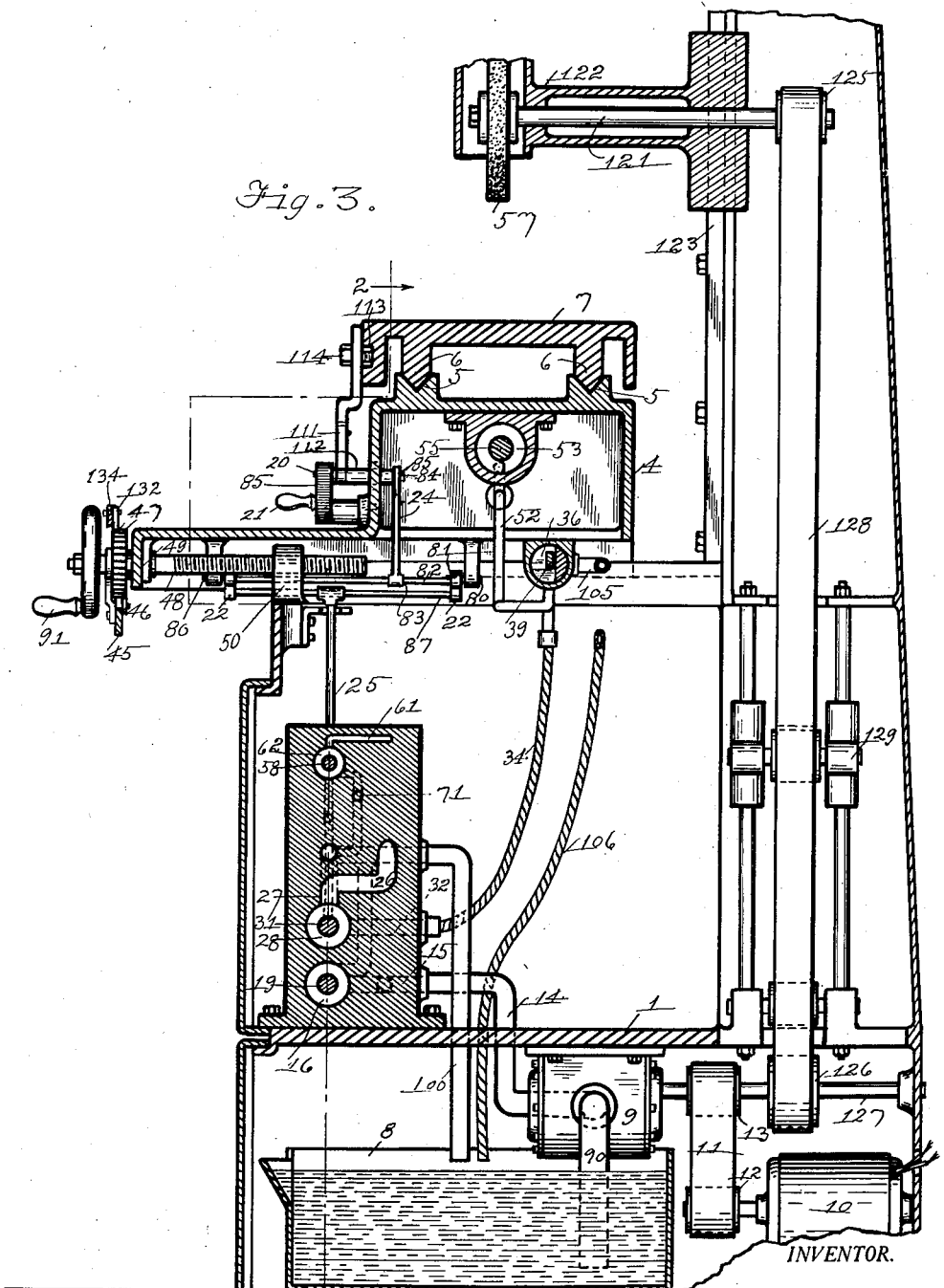

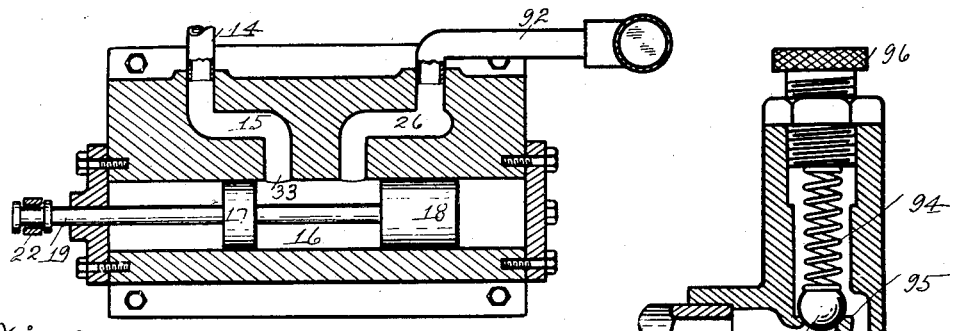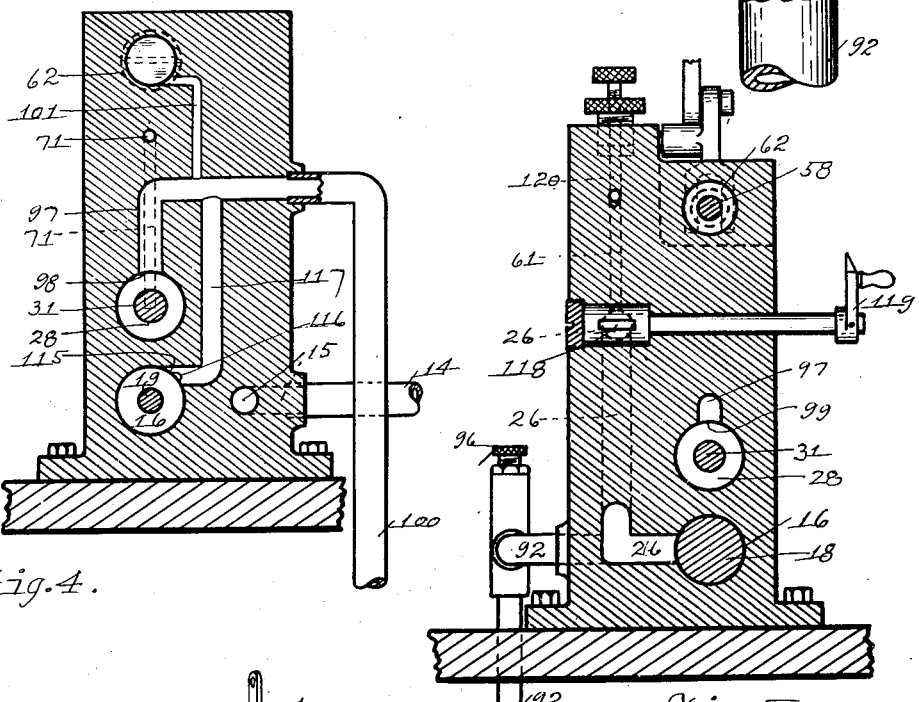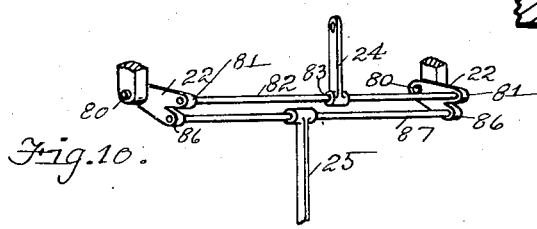

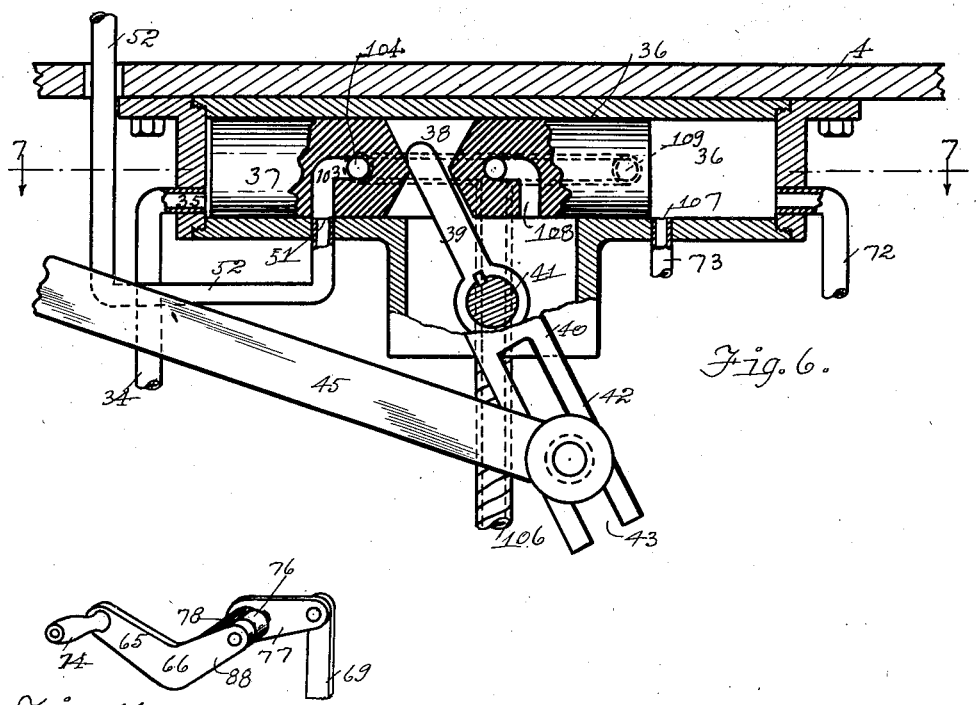
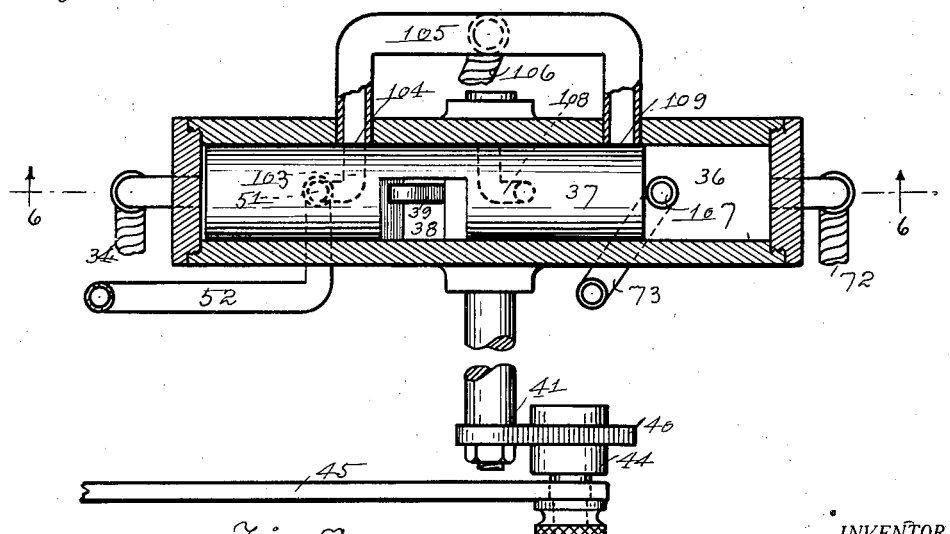

Patented Apr. 19, 1932

1,854,610

UNITED STATES PATENT OFFICE

JACOB DE KONING, OF GRAND RAPIDS, MICHIGAN, ASSIGNOR TO GALLMEYER AND LIVINGSTON COMPANY, OF GRAND RAPIDS, MICHIGAN, A CORPORATION OF MICHIGAN

WORK-FEEDING MECHANISM

Application filed February 21, 1930. Serial No. 430,204.

The present invention relates to feeding mechanism, such as is employed in connection with machine tools (as grinding machines and the like) for moving or "feeding" a work piece to, and under the action of, the tool; and its object is, generally, to provide an improved mechanism of that character; and more particularly, to provide such a mechanism comprising a movable member or bed, a second member or carrier for the work piece movable on said bed in a direction transverse to the bed's movement, means operated by fluid pressure for moving the carrier, means operated by said means for moving the bed, means for creating the fluid pressure, and means intermediate the aforementioned means for actuating and controlling one such means by another and for imparting movement from one to another.

These and any other and more specific objects hereinafter appearing are attained by, and the invention finds preferable embodiment in, the structure and mechanism hereinafter particularly described in the body of this specification and illustrated by the accompanying drawings, in which:

Figure 2 is a vertical sectional view thereof taken on line 2—2 of Figure 3;

Figure 3 is a vertical sectional view of the same taken on line 3—3 of Figure 2;

Figure 4 is a vertical sectional view of certain parts thereof taken on line 4—4 of Figure 2;

Figure 5 is a vertical sectional view of certain parts of the same taken on line 5—5 of Figure 2;

Figure 6 is a vertical sectional view of certain parts thereof taken on line 6—6 of Figure 7;

Figure 7 is a horizontal sectional view of said parts taken on line 7—7 of Figure 6;

Figure 8 is a horizontal sectional view of certain parts taken on line 8—8 of Figure 2;

Figure 9 is a central vertical sectional view of certain valve-controlled parts;

Figure 10 is a view in perspective of certain valve-operating means; and

Figure 11 is a view in perspective of another valve-operating means.

Figure 1:
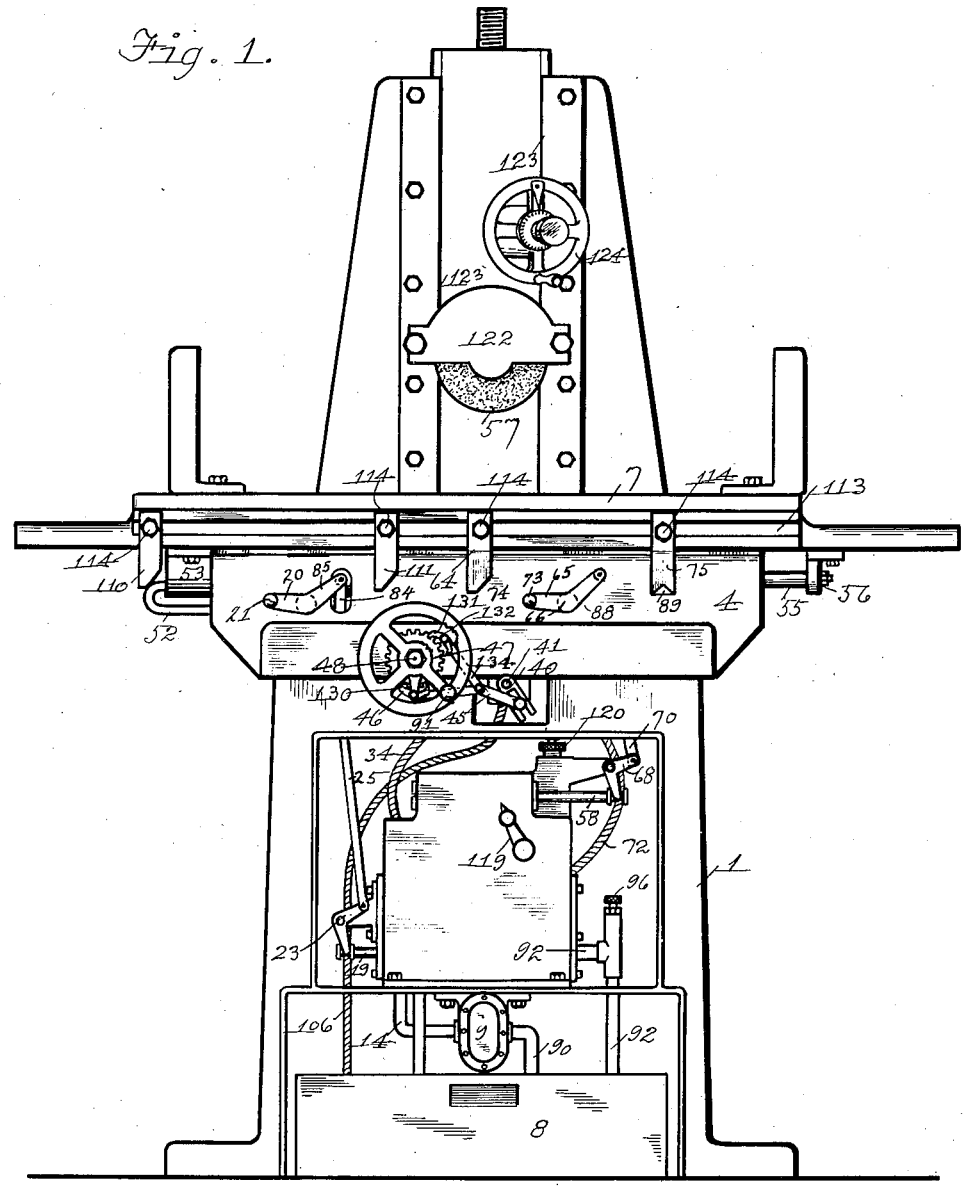
Figure 1 is a front elevational view of a grinding machine equipped with my work-feeding mechanism, the front cover plates being removed to show interior parts.

In the embodiment of the invention illustrated by these drawings, the hollow base casting 1 has horizontal ways 2 extending forwardly and rearwardly in which slidably bear the runners 3 of a hollow bed 4 having horizontal ways 5 extending in a direction transverse to the ways 2 and in which the runners 6 of the work carrier 7 slidably bear. The bed 4 and the carrier 7 with the work-piece on its upper surface are alternately fed or moved along the ways in the following manner and sequence and by the following mechanism:

Referring particularly to Figure 2 (in which the parts are shown in one of the positions they assume during the regular running operation of the machine) oil pumped from a tank 8 through intake pipe 90 by a suitable pump 9 driven by a motor 10 through a belt 11 carried by pulleys 12, 13 on the motor's and pump's shafts, passes through a conduit 14, 15 venting at 33 into the cylinder or valve chamber 16 (see Figure 8) between the valve's piston heads 17, 18 spaced apart on the valve stem 19 which, for the purpose of initiating the operation of the mechanism, has been slid to the position seen in these views by suitable means, as the lever 20 (having the handle portion 21), bell crank levers 22, 23 and connecting rods 24, 25.

The oil is forced by the pump from valve chamber 16 through passage 26 venting at 27 (see Figures 2, 3 and 4) into the cylinder or valve chamber 28 between the valve's piston heads 29, 30 spaced apart on the valve stem 31. This valve (having the piston heads 29, 30) being now in the slid position seen in Figure 2, the oil is forced by the pump from valve chamber 28 through a passage 32 and the flexible pipe 34 venting (see Figures 6 and 7) at 35 into the left-hand end of a cylinder or valve chamber 36 carried by the bed 4 and containing the piston 37. When this piston has, by the fluid pressure, been moved far enough toward the right-hand side of Figures 6 and 7, it opens the port 51 whereby the oil under pressure of the pump passes through pipe 52 and into the left-hand end of a cylinder 53 carried by the bed 4 and moves the piston 54 therein toward the right-hand side of Figures 1 and 2, the piston's rod 55 attached at 56 to the carrier 7 thus moving this carrier and the workpiece thereon in the right-hand feeding movement of this carrier. The workpiece is thus fed under the action of the grinding wheel 57 by the pump acting through the fluid-pressure line.

During the operations above described, the valve stem 58 and the valve's spaced piston heads 59, 60 thereon are in the position seen in Figure 2 wherein the oil is forced by the pump from passage 26 through its narrow branch passage 61 into the cylinder or valve chamber 62 containing said valve and between its piston heads and is forced out of this valve chamber through the passage 63 so that it presses the right-hand end of the valve stem 31 to the position seen in Figure 2.

When the right-hand feeding operation of the carrier 7 above described is nearing its end, the arm 64 projecting downwardly from the carrier 7 strikes the roller 76 on arm 88 of a bell crank lever 66 (see Figure 11) and depresses said arm turning this lever on its fulcrum shaft 78 (journalled on the bed 4) so that another arm 77 on said shaft is likewise depressed, and by means of bell crank levers 67, 68 and connecting rods 69, 70, slides the valve stem 58 and the heads 59, 60 thereon toward the left-hand side of Figure 2.

By the action above described, the branch passage 63 to valve chamber 62 is closed by the head 60 and the narrow passage 71 is opened whereby the oil pressure on the left-hand end of valve stem 31 slides the same toward the right-hand side of Figure 2 thus closing (by the head 29) the port from valve chamber 28 to pipe 34 and opening a port from said chamber communicating with the flexible pipe 72 leading into the right-hand end of valve chamber 36. The pumped oil now slides the valve piston 37 toward the left-hand side of Figures 1, 2, 6 and 7.

This piston 37 has a notch 38 in which bears the arm 39 of a lever 40 pivotally mounted at 41 and whose other arm 42 has a longitudinal slot 43 (see Figure 6) in which slot is adjustably held a block 44 to which is pivoted a link 45 having a pivotally-mounted pawl 46 (see Figure 1). The carrier 7 having completed its right-hand movement wherein the workpiece is carried beyond the field of operation of the grinding wheel 57, the above described left-hand movement of piston valve 37 (preparatory to the reverse or left-hand feeding movement of the carrier) swings lever 40 toward its position seen in Figure 6 thus causing the tooth 130 of said pawl to operatively engage the teeth of a wheel 47 (Figure 1) on the threaded shaft 48 journalled at 49 on the bed 4 and turning in a nut portion 50 of the base 1 (see Figure 3), thereby feeding or moving the bed 4 preparatory to said reverse or left-hand feeding movement of carrier 7.

This valve piston 37 having moved to the position seen in Figures 6 and 7, the pumped oil passes from chamber 36 through pipe 73 into cylinder 53 and on the right-hand side of piston 54 thus sliding said piston, piston rod 55 and the carrier 7 in its left-hand feeding movement toward the left-hand side of Figures 1 and 2.

As the carrier 7 nears the end of its said left-hand movement, the upwardly turned end 89 of arm 75 projecting downwardly from the carrier 7 strikes and raises the roller 76 on arm 88 of lever 66 and moves the valve stem 58 toward the right-hand side of Figure 2, and into the position seen in that view. The carrier 7 having completed its left-hand movement wherein the workpiece is carried beyond the field of the grinding wheel's operation, the hereinbefore described right-hand movement of piston valve 37 (preparatory to a repetition of the right-hand feeding movement of the carrier) swings lever 40 oppositely and from its position seen in Figure 6, thus causing the tooth 131 of a second pawl 132 pivotally mounted on arm 134 of link 45 to operatively engage the teeth of wheel 47, thereby again feeding or moving the bed 4 preparatory to said right-hand feeding movement of the carrier. The cycle of the mechanism's regular operations is completed and the operations described are automatically repeated. The pawls 46 and 132 have opposite teeth respectively and may be turned about their pivotal mounting on the link 45, so that the movement of the bed 4 may be reversed.

In order to permit the movement of the bed 4 on the ways 2, the pair of bell crank levers 22 are fulcrumed at 80 on this bed, the arms 81 of these levers being connected by a rod 82 on which is pivoted at 83 the lower end of link 24 whose upper end is pivoted at 84 on arm 85 of lever 20; and the other arms 86 of levers 22 are connected by a rod 87 on which turns and also slides the upper end of link 25 (see Figure 10).

It will thus be seen that the work carrier 7 is reciprocated in its operative feeding movement and in its reverse movement directly by oil pressure created by the pump 9; and that the bed 4 is moved rearwardly in its operative feeding movement (preparatory to said operative feeding movement of the work carrier) by oil pressure indirectly through the threaded shaft 48, this shaft being manually turnable reversely by its crank handle 91 to return the bed 4 to its initial forward position.

Means are shown for venting oil from the cylinders and returning the same to the tank 8, viz.: If the pump is running without operating the feeding mechanism or if oil pressure in cylinder 16 (and throughout the oil circuit) becomes too great under the pump's action, the oil vents through pipe 92 (branching from passage 26) and past a check valve 93 into the tank, this valve being spring-pressed at 94 on its seat 95 and the tension of the spring being regulated by a screw cap 96 (see Figures 2, 8 and 9). A passage 97 has ports 98, 99 from the valve chamber 28 at the left hand side of head 29 and at the right hand side of head 30 respectively, so that any oil on said sides of said heads may be forced through these ports, said passage 97 and its continuing pipe 100, into the tank 8 (see Figures 2, 3, 4 and 5). Passages 101 and 102 lead from the valve chamber 62 at the left hand side of head 59 and at the right hand side of head 60 respectively and vent into said passage 97 (see Figures 2 and 4).

Any oil which may accumulate in cylinder or valve chamber 16 at the left hand side of piston head 17 is expelled through port 115 (and groove 116 leading thereto) into passage 117 which vents into the passage 97 (see Figures 2 and 4).

When the piston head 54 in cylinder 53 moves toward the left hand side of Figures 1 and 2, oil on that side of the piston head is expelled through pipe 52, its port 51 to cylinder 36, the registering passage 103 of piston valve 37, registering port 104 of this cylinder and pipe 105, and downwardly therefrom through flexible pipe 106 to the tank; when however the piston head 54 moves toward the right hand side of Figures 1 and 2, oil on that side of the piston head is expelled through pipe 73, its port 107 to cylinder 36, the then registering passage 108 of piston valve 37, the then registering port 109 of this cylinder and pipe 105, and downwardly therefrom through the flexible pipe 106 (see Figures 2, 6 and 7).

After initiating the operation of the mechanism by turning lever 20 by its handle 21 to slide the valve stem 19 to the position seen in Figure 2, the mechanism operates automatically and continuously (as above explained) by the downwardly extending arms 64 and 75 striking the roller 76 and swinging the lever 66 in the right hand movement and in the left hand movement respectively of the carrier 7; when however it is desired to move the carrier to an extreme right hand position (as for placing workpieces thereon) the carrier's downwardly extending arms 110, 111 in such movement strike the extension 112 of arm 85 of lever 20 (see Figure 3) and the roller 76 of lever 66 respectively, at approximately the same time, thus sliding valve stem 19 toward the left hand side of Figure 2 to close the port from valve chamber 16 to passage 26 and discontinue the operation of the mechanism (although the pump continues operating), and also sliding the valve stem 58 toward the left hand side of Figure 2, the reverse or left hand movement of the carrier sliding, by the arm 75, the valve stem 58 to its position seen in Figure 2 preparatory to next initiating the mechanism's operation.

The arms 110, 111 and 64 have knee joints as shown so that in moving toward the left hand side of Figure 2 they will not operatively engage any part; and these arms and also arm 75 are mounted at their upper ends in a horizontal groove 113 in the carrier 7 in which they are adjustably secured by set screws 114.

A valve 118 adjustably controls the flow of oil through passage 26 having a handle portion 119 (see Figures 1, 2 and 5); and a needle valve 120 adjustably controls the flow through the narrow branch passage 61 (see Figures 2 and 5).

The journal 121 of the grinding wheel 57 turns in a block 122 slidable vertically in a way 123 by any usual means, as that indicated at 124, said journal having a pulley 125 on which and on pulley 126 on the pump's shaft 127 is carried the belt 128 having suitable tightening means indicated at 129.

The invention being intended to be pointed out in the claims, is not to be limited to or by details of construction of the particular embodiment thereof illustrated by the drawings or hereinbefore described.

I claim:

1. In an organization of the character described: a base carrying a tool; a bed member having a movement on the base; a carrier member having a movement on the bed member transverse to the movement thereof; means for moving said members in feeding relation to the tool comprising a fluid-pressure line, a cylinder in said line containing a piston valve, a second cylinder containing a piston connected to one of said members for actuating the same said second cylinder having a fluid-passage from the first-mentioned cylinder, mechanical means directly actuated by the movement of the piston valve for moving the other one of said members.

2. In an organization of the character described: a base carrying a tool; a bed member having a movement on the base; a carrier member having a movement on the bed member transverse to the movement thereof; means for moving said members in feeding relation to the tool comprising a fluid-pressure line, a cylinder in said line containing a piston valve, a second cylinder containing a piston connected to one of said members for actuating the same, said second cylinder having a fluid-passage from the first-mentioned cylinder controlled by the movement of the piston valve, mechanical means directly actuated by the movement of the piston valve for moving the other one of said members.

3. In an organization of the character described: a base carrying a tool; a bed member having a sliding movement on the base; a carrier member having a sliding movement on the bed member transverse to the movement thereof; means for moving said members in feeding relation to the tool comprising a fluid-pressure line, a cylinder in said line containing a piston valve, a second cylinder containing a piston connected to one of said members for sliding the same, said second cylinder having a fluid-passage from the first-mentioned cylinder controlled by the movement of the piston valve; mechanical means for moving the other one of said members, a lever arm swingable by the piston valve, and connections between said lever and said mechanical means for actuating the same by the movement of the lever arm.

4. In an organization of the character described: a base carrying a tool; a bed member having a sliding movement on the base; a carrier member having a sliding movement on the bed member transverse to the movement thereof; means for moving said members in feeding relation to the tool comprising a fluid-pressure line, a cylinder in said line containing a piston valve, a second cylinder containing a piston connected to one of said members for sliding the same, said second cylinder having a fluid-passage from the first-mentioned cylinder controlled by the movement of the piston valve; mechanical means for moving the other one of said members including a threaded shaft having a ratchet wheel, a lever arm swingable by the piston valve and a link connected to the lever arm and having a pawl engaging said wheel.

5. In an organization of the character described: a base carrying a tool; a bed member having a sliding movement on the base; a carrier member having a sliding movement on the bed member transverse to the movement thereof; means for moving said members alternately in feeding relation to the tool comprising a fluid-pressure line, a cylinder in said line containing a piston valve, a second cylinder containing a piston connected to one of said members for sliding the same, said second cylinder having fluid-passages to its opposite ends from the opposite ends of the first-mentioned cylinder controlled by the opposite movements of the piston valve, mechanical means directly actuated by the movement of the piston valve for moving the other one of said members.

6. In an organization of the character described: a base carrying a tool; a bed member having a sliding movement on the base; a carrier member having a sliding movement on the bed member transverse to the movement thereof; means for moving said members alternately in feeding relation to the tool comprising a fluid-pressure line, a cylinder in said line containing a piston valve, a second cylinder containing a piston connected to one of said members for actuating the same, said second cylinder having fluid-passages to its opposite ends from the opposite ends of the first-mentioned cylinder controlled by the opposite movements of the piston valve, the first-mentioned cylinder having fluid-pressure inlets to its opposite ends controlled by the movement of one of said members, mechanical means directly actuated by the movement of the piston valve for moving the other one of said members.

7. In an organization of the character described: a base carrying a tool; a bed member having a sliding movement on the base; a carrier member having a sliding movement on the bed member transverse to the movement thereof; means for moving said members alternately in feeding relation to the tool comprising a fluid-pressure line, a cylinder in said line containing a piston valve, a second cylinder containing a piston connected to one of said members for actuating the same in the sliding movement thereof, said second cylinder having fluid-passages to its opposite ends from the opposite ends of the first-mentioned cylinder controlled by the opposite movements of the piston valve, the first-mentioned cylinder having fluid-pressure inlets to its opposite ends, mechanical means directly actuated by the movement of the piston valve for moving the other one of said members, valve mechanism controlling said inlets operated by the opposite movements of the carrier member.

8. In an organization of the character described: a base carrying a tool; a bed member having a sliding movement on the base; a carrier member having a sliding movement on the bed member transverse to the movement thereof; means for moving said members alternately in feeding relation to the tool comprising a fluid-pressure line, a cylinder in said line containing a piston, a second cylinder containing a piston connected to one of said members and having fluid-passages to its opposite ends from the opposite ends of the first-mentioned cylinder controlled by the opposite movements of the first-mentioned piston, the first-mentioned cylinder having fluid-pressure inlets to its opposite ends, means actuated by the movement of the first-mentioned piston for moving the other one of said members, valve mechanism for controlling said inlets comprising a valve casing in said line having fluid-passages to said inlets respectively and containing a valve movable to a position opening one of said ports and closing the other and vice versa, a second valve casing in said line having fluid-passages to the opposite ends of the first-mentioned valve casing for moving the valve therein and containing a valve movable to a position opening one of said last-mentioned passages and closing the other and vice versa, the last-mentioned valve being operated by the movements of the carrier member.

9. In an organization of the character described: a base carrying a tool; a bed member having a sliding movement on the base; a carrier member having a sliding movement on the bed member transverse to the movement thereof; means for moving said members alternately in feeding relation to the tool comprising a fluid-pressure line, a cylinder in said line containing a piston valve, a second cylinder containing a piston connected to one of said members for actuating the same in the sliding movement thereof, said second cylinder having fluid-passages to its opposite ends from the opposite ends of the first-mentioned cylinder controlled by the opposite movements of the piston valve, the first-mentioned cylinder having fluid-pressure inlets to its opposite ends, mechanical means directly actuated by the movement of the piston valve for moving the other one of said members, valve mechanism controlling said inlets operated by the opposite movements of the carrier member, and a valve in said line movable to closed position by the movement of one of said members to an extreme slid position.

10. In an organization of the character described: a base carrying a tool; a bed member having a sliding movement on the base; a carrier member having a sliding movement on the bed member transverse to the movement thereof; means for moving said members in feeding relation to the tool and for moving the same reversely comprising a fluid-pressure line, cylinders arranged in series in said line containing pistons having connections with said members respectively for sliding the same, one of the pistons constituting a valve for controlling the other piston in the movement of one of the members and being mechanically connected with the other member for directly actuating the same, and means for controlling the fluid-pressure in the cylinders actuated by the movement of a movable part of the organization.

11. In an organization of the character described: a base carrying a tool; a bed member having a sliding movement on the base; a carrier member having a sliding movement on the bed member transverse to the movement thereof; means for moving said members in feeding relation to the tool comprising a fluid-pressure line, cylinders arranged in series in said line containing pistons having connections with said members respectively for sliding the same, and means actuated by the movement of a movable part of the organization for controlling the fluid-pressure in the cylinders comprising a valve in said line between the cylinders, a valve in said line movable to positions controlling the opposite movements respectively of one of the pistons and a valve in said line movable to positions controlling the opposite movements respectively of the second-mentioned valve.

12. In an organization of the character described: a base carrying a tool; a bed member having a sliding movement on the base; a carrier member having a sliding movement on the bed member transverse to the movement thereof; means for moving said members in feeding relation to the tool comprising a fluid-pressure line, a cylinder in said line containing a piston valve, a second cylinder containing a piston connected to one of said members for actuating the same in the sliding movement thereof, said second cylinder having fluid-passages to its opposite ends from the opposite ends of the first-mentioned cylinder controlled by the opposite movements of the piston valve, mechanical means directly actuated by the movement of the piston valve for moving the other one of said members.

13. In an organization of the character described: a base carrying a tool; a bed member having a sliding movement on the base; a carrier member having a sliding movement on the bed member transverse to the movement thereof; means for moving said members in feeding relation to the tool comprising a fluid-pressure line, a cylinder in said line containing a piston valve, a second cylinder containing a piston connected to one of said members for actuating the same in the sliding movement thereof, said second cylinder having fluid-passages to its opposite ends from the opposite ends of the first-mentioned cylinder controlled by the opposite movements of the piston valve, the first-mentioned cylinder having fluid-pressure inlets to its opposite ends controlled by the movement of one of said members, mechanical means directly actuated by the movement of the first-mentioned piston for moving the other one of said members.

14. In an organization of the character described: a base carrying a tool; a bed member having a sliding movement on the base; a carrier member having a sliding movement on the bed member transverse to the movement thereof; means for moving said members in feeding relation to the tool comprising a fluid-pressure line, a cylinder in said line containing a piston valve, a second cylinder containing a piston connected to one of said members for actuating the same in the sliding movement thereof, said second cylinder having fluid-passages to its opposite ends from the opposite ends of the first-mentioned cylinder controlled by the opposite movements of the piston valve, the first-mentioned cylinder having fluid-pressure inlets to its opposite ends, mechanical means directly actuated by the movement of the piston valve for moving the other one of said members, valve mechanism controlling said inlets operated by the opposite movements of the carrier member.

15. In an organization of the character described: a base carrying a tool; a bed member having a sliding movement on the base; a carrier member having a sliding movement on the bed member transverse to the movement thereof; means for moving said members in feeding relation to the tool comprising a fluid-pressure line, a cylinder in said line containing a piston, a second cylinder containing a piston connected to one of said members and having fluid-passages to its opposite ends from the opposite ends of the first-mentioned cylinder controlled by the opposite movements of the first-mentioned piston, the first-mentioned cylinder having fluid-pressure inlets to its opposite ends, means actuated by the movement of the first-mentioned piston for moving the other one of said members, valve mechanism for controlling said inlets comprising a valve casing in said line having fluid-passages to said inlets respectively and containing a valve movable to a position opening one of said ports and closing the other and vice versa, a second valve casing in said line having fluid-passages to the opposite ends of the first-mentioned valve casing for moving the valve therein and containing a valve movable to a position opening one of said last-mentioned passages and closing the other and vice versa, the last-mentioned valve being operated by the movements of the carrier member.

16. In an organization of the character described: a base carrying a tool; a bed member having a sliding movement on the base; a carrier member having a sliding movement on the bed member transverse to the movement thereof; means for moving said members in feeding relation to the tool comprising a fluid-pressure line, a cylinder in said line containing a piston, a second cylinder containing a piston connected to one of said members and having fluid-passages to its opposite ends from the opposite ends of the first-mentioned cylinder controlled by the opposite movements of the first-mentioned piston, the first-mentioned cylinder having fluid-pressure inlets to its opposite ends, means actuated by the movement of the first-mentioned piston for moving the other one of said members, valve mechanism controlling said inlets operated by the opposite movements of the carrier member, and a valve in said line movable to closed position by the movement of one of said members to an extreme slid position.

In testimony whereof I have hereunto set my hand at Grand Rapids, Michigan, this 18th day of February, 1930.

JACOB DE KONING.